United States Patent
Van Druten et al.

(10) Patent No.: US 8,770,164 B2
(45) Date of Patent: Jul. 8, 2014

(54) STARTING METHOD AND STARTING DEVICE FOR STARTING A COMBUSTION ENGINE AND/OR DRIVING A VEHICLE

(71) Applicant: DTI Group, B.V., Eindhoven (NL)

(72) Inventors: Roell Marie Van Druten, Eindhoven (NL); Alexander Franciscus Anita Serrarens, Waalre (NL); Bas Gerard Vroemen, Eindhoven (NL)

(73) Assignee: DTI Group, B.V., Eindhoven (NL)

( * ) Notice: Subject to any disclaimer, the term of this patent is extended or adjusted under 35 U.S.C. 154(b) by 0 days.

(21) Appl. No.: 13/895,736

(22) Filed: May 16, 2013

(65) Prior Publication Data
US 2013/0247858 A1    Sep. 26, 2013

Related U.S. Application Data

(63) Continuation of application No. PCT/NL2011/050794, filed on Nov. 22, 2011.

(30) Foreign Application Priority Data

Nov. 18, 2010   (NL) .................................... 2005722

(51) Int. Cl.
*F02N 11/00* (2006.01)

(52) U.S. Cl.
USPC ............... 123/179.25; 123/179.28; 123/185.8

(58) Field of Classification Search
USPC ........... 701/113; 123/179.22, 179.25, 179.28, 123/185.1, 185.8; 74/6, 7 C
See application file for complete search history.

(56) References Cited

U.S. PATENT DOCUMENTS

| | | | |
|---|---|---|---|
| 4,626,696 A * | 12/1986 | Maucher et al. | 290/38 R |
| 5,713,425 A * | 2/1998 | Buschhaus et al. | 180/65.25 |
| 6,250,270 B1* | 6/2001 | Ahner et al. | 123/179.3 |
| 6,528,959 B2* | 3/2003 | Kitano et al. | 318/55 |
| 6,543,561 B1* | 4/2003 | Pels et al. | 180/65.23 |
| 6,617,703 B2* | 9/2003 | Matsubara et al. | 290/40 C |
| 7,610,891 B2* | 11/2009 | Seufert et al. | 123/179.25 |
| 8,037,858 B2* | 10/2011 | Seufert et al. | 123/179.25 |
| 8,113,309 B2* | 2/2012 | Allgaier | 180/65.265 |
| 8,205,697 B2* | 6/2012 | Delisle et al. | 180/65.265 |
| 2002/0007974 A1* | 1/2002 | Nagano et al. | 180/65.2 |
| 2012/0090569 A1* | 4/2012 | Van Druten et al. | 123/179.25 |
| 2012/0116624 A1* | 5/2012 | Reith | 701/22 |
| 2013/0091985 A1* | 4/2013 | Van Druten et al. | 74/7 C |

FOREIGN PATENT DOCUMENTS

| | | |
|---|---|---|
| FR | 2 729 435 | 7/1996 |
| GB | 2 047 816 | 12/1980 |
| WO | WO 2010/068100 | 6/2010 |

* cited by examiner

*Primary Examiner* — Hai Huynh
(74) *Attorney, Agent, or Firm* — Eric Karich

(57) ABSTRACT

A combustion engine can be started by means of a starting device. During the starting operation attendant with the starting device driving the vehicle this drive is also effected by energizing a clutch which connects the combustion engine via a transmission to the wheels L of the vehicle. By utilizing the starting device for the starting operation also for meanwhile driving the vehicle and/or accelerating same, a faster and/or more gradual drive/acceleration of the vehicle is realized.

7 Claims, 2 Drawing Sheets

Figure 1:
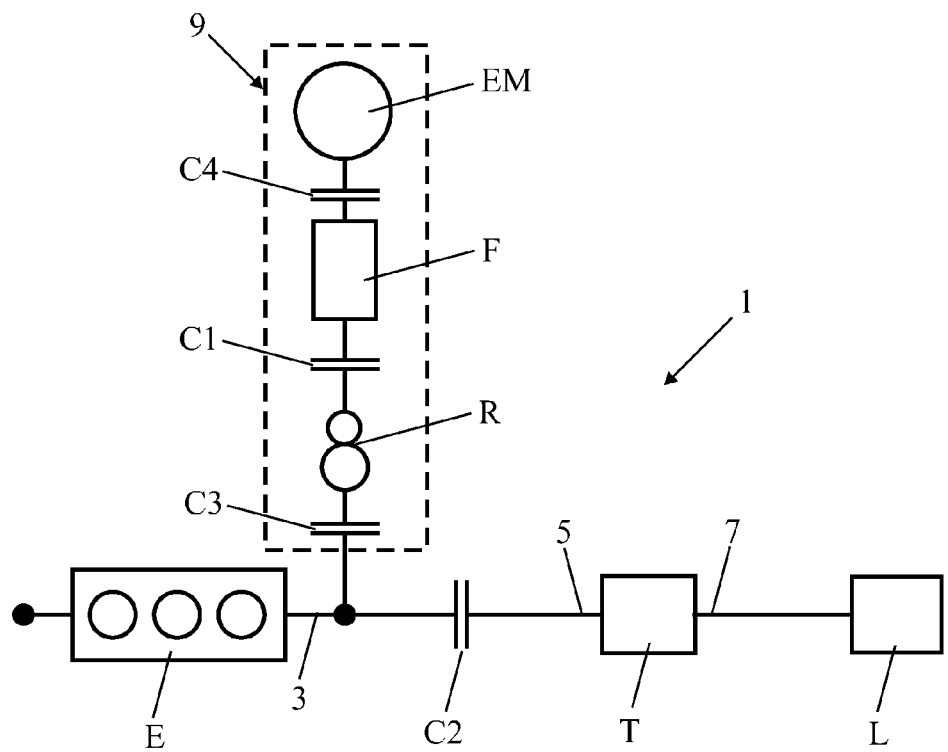

STARTING METHOD AND STARTING DEVICE FOR STARTING A COMBUSTION ENGINE AND/OR DRIVING A VEHICLE

CROSS-REFERENCE TO RELATED APPLICATIONS

This application for a utility patent is a continuation of a previously filed patent application, now abandoned, having the application number PCT/NL2011/050794, filed Nov. 22, 2011. This application also claims the benefit of NL 2005722, filed Nov. 18, 2010.

FIELD OF THE INVENTION

The invention relates to a starting method for starting a combustion engine and/or driving a vehicle by means of a starting device that is connected to an output shaft of the combustion engine, which output shaft is connected by means of a clutch to a transmission and/or wheels of the vehicle.

The starting device may be formed, for example, by an electromotor or may comprise a flywheel that can be coupled to the combustion engine by means of a coupling.

STATE OF THE ART

A starting method for starting a combustion engine of a vehicle by means of a starting device is generally known. According to the known starting method the combustion engine, once it has been started, is coupled to the wheels of the vehicle by means of a transmission, or during driving or coasting with a switched-off combustion engine, is restarted for subsequently driving or accelerating again.

SUMMARY OF THE INVENTION

It is an object of the invention to provide a starting method of the type defined in the opening paragraph where the driving and/or acceleration of the vehicle is effected faster and/or more smoothly after the combustion engine has been (re) started. To this end the starting method according to the invention is characterised in that, while the combustion engine is being started by means of the starting device the clutch is energized for driving or accelerating the vehicle. By utilizing the starting device for the starting operation also for meanwhile driving the vehicle and/or accelerating same, a faster and/or more gradual drive/acceleration of the vehicle is realized than with the known starting method.

An embodiment of the starting method according to the invention is characterised in that prior to fuel being injected into the combustion engine, the clutch is energized for driving or accelerating the vehicle. As a result, an even faster and/or more gradual drive/acceleration of the vehicle is realized.

Preferably, before the first combustion action in the combustion engine is initiated, the clutch is energized for driving or accelerating the vehicle. This leads to an even faster and/or more gradual drive/acceleration of the vehicle.

For a vehicle in which the starting device comprises a flywheel as well as a further clutch which is positioned between the flywheel and the output shaft of the combustion engine, an advantageous embodiment of the starting method according to the invention is characterised in that while the further clutch is being energized for starting the combustion engine by means of the flywheel, also the clutch is energized for driving or accelerating the vehicle.

When the clutch is energized, sections of the clutch are pushed together and come into contact with each other while there is a possibility of sections slipping relative to each other (if there is a difference in number of revolutions between the clutch sections) and torque transfer make take place to a greater or lesser extent. When energized, the clutch may close completely (after some time, but need not do this) and the slipping behaviour between the clutch sections will be terminated.

In this embodiment the further clutch C1 can first be energized before clutch C2 is energized for driving or accelerating the vehicle, or first the clutch C2 can be energized before the further clutch C1 is energized for starting the combustion engine and driving or accelerating the vehicle.

For a vehicle in which an auxiliary electromotor is connected to the flywheel, a further advantageous embodiment of the starting method according to the invention is characterised in that the auxiliary electromotor spins up the flywheel or maintains the flywheel at the right number of revolutions before the further clutch is energized. In consequence, there is always an amount of energy available in the flywheel for briefly transmitting sufficient driving power and/or acceleration to the vehicle.

A further advantageous embodiment of the starting method according to the invention is characterised in that the flywheel is spun up or maintained at the right number of revolutions by energizing the further clutch while the combustion engine is running.

The starting device may be connected to the crankshaft both on the side of the pulley (multi-V belt) and on the transmission side of the combustion engine.

For a vehicle in which there is a reduction gear present between the further clutch and the output shaft and an auxiliary clutch is present between the reduction gear and the output shaft, a further advantageous embodiment of the starting method according to the invention is characterised in that during the revving up of the combustion engine the drive from the combustion engine to the reduction gear is interrupted by the auxiliary clutch. This may be effected, for example, by embodying the auxiliary clutch as a one-way clutch or freewheel bearing or by embodying the auxiliary clutch as a centrifugal decoupling. Said reduction gear preferably reduces from the flywheel to the combustion engine by a factor of 10 for increasing the torque of the flywheel for the starting of the combustion engine and/or the driving of the vehicle. In order not to have an unnecessarily heavy construction of the reduction gear section (in a gear reduction this is the end gear) connected to the further clutch when the combustion engine is revved up during the ride, to be capable of rotating at the attendant high number of revolutions, the drive from the combustion engine to the end gear can be interrupted by means of the auxiliary clutch.

The advantage of a centrifugal decoupling as an auxiliary clutch is that in that case the combustion engine can also be utilized for spinning up the flywheel or maintaining the right number of revolutions and, in consequence, no additional auxiliary electromotor is needed.

The invention also relates to a starting device for starting a combustion engine, comprising a flywheel, a clutch having two clutch sections of which a first clutch section is connected to the flywheel. With respect to the starting device the invention is characterised in that the starting device further includes a reduction gear having an input and an output, of which the input is connected to the second clutch section of the clutch, and in that the starting device comprises an auxiliary clutch of which a first clutch section is connected to the output of the reduction gear and a second clutch section forms an output of the starting device, which output can be coupled to an output shaft of a combustion engine.

Furthermore, the invention relates to a vehicle comprising a combustion engine, a transmission having an input and an output, and wheels to be driven, which wheels are connected to the output of the transmission. With respect to the vehicle the invention is further characterised in that the vehicle further includes a starting device according to the invention, whose output is connected to the output shaft of the combustion engine.

The output of the starting device is preferably directly connected to the output shaft of the combustion engine.

BRIEF DESCRIPTION OF THE DRAWING FIGURES

Figure 3:
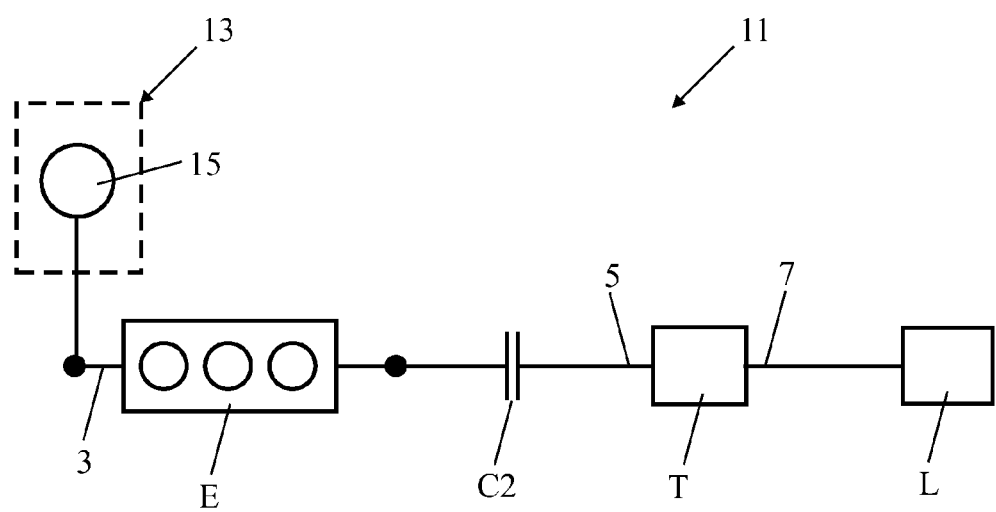
Figure 2:
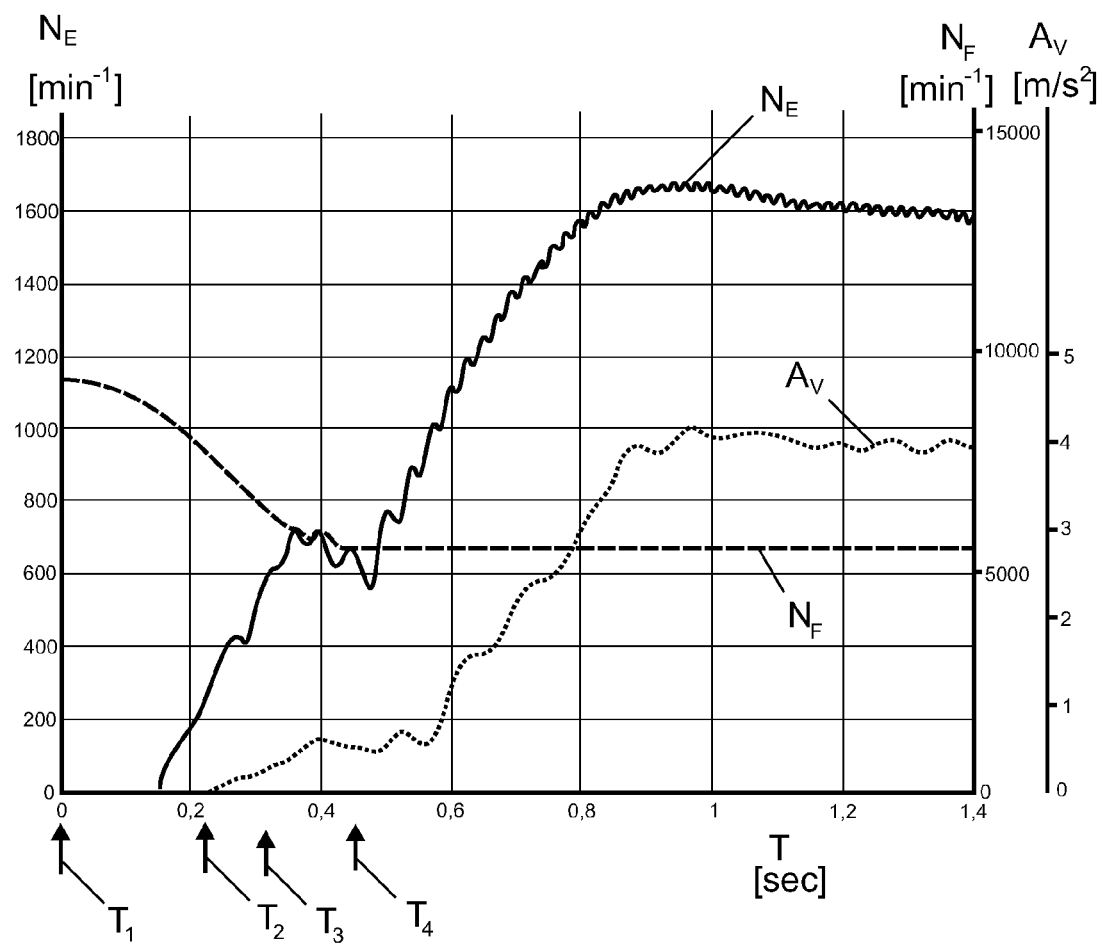

The invention will be further described below in more detail with reference to a diagrammatic representation of examples of embodiment of the starting method and vehicle comprising a starting device according to the invention given in drawing figures, in which:

FIG. 1 shows a first embodiment of the vehicle according to the invention in which the starting method according to the invention can be implemented;

FIG. 2 gives a graphical representation of the pattern of the various steps of the starting method according to the invention; and FIG. 3 shows a second embodiment of the vehicle according to the invention in which the starting method according to the invention can be implemented.

DETAILED DESCRIPTION OF THE DRAWING FIGURES

FIG. 1 shows in a diagrammatic manner a first embodiment of the vehicle according to the invention in which the starting method according to the invention can be implemented. The vehicle 1 has an internal combustion engine E comprising an output shaft 3 (crankshaft) which is connected to an input shaft 5 of a transmission T via a clutch C2. This may be an automatic or a manually operated transmission in which the transmission ratio may adopt at least two, but preferably more different values. The output shaft 7 of the transmission T is connected to wheels L of the vehicle. This connection may be a direct or an indirect connection for example via an end drive and a differential.

The vehicle 1 further comprises a starting device 9 which in this embodiment is connected on the transmission side of the combustion engine E to the output shaft 3 (but this may also be effected on the side of the pulley or Multi V belt). The starting device 9 is formed by a flywheel F, a clutch C1 having two clutch sections of which a first clutch section is connected to the flywheel, a reduction gear R having a gear input and a gear output, of which the gear input is connected to the second clutch section of the clutch C1, and an auxiliary clutch C3 of which a first clutch section is connected to the output of the reduction gear R and a second clutch section forms an output of the starting device. The output of the starting device 9 is connected to the output shaft 3 at a location in the drive line between the combustion engine E and the clutch C2. In this embodiment the reduction gear R is arranged as a gear reduction that has a delaying effect from the flywheel F to the combustion engine E and has a transmission ratio of about 10:1.

For starting the combustion engine E and driving the wheels L during the start, the further clutch C1 as well as the clutch C2 are energized in this vehicle. The flywheel F will then provide the required energy and/or the required torque. By energizing the clutch, sections of the clutch are pushed against each other so that the clutch can start transmitting torque. Some time elapses (which may be very brief, 100 ms) from the moment the clutch sections come into contact with each other and thereby slip relative to each other, up to the moment when the clutch is no longer synchronized or is completely closed and there is less slip or no slip at all left between the clutch sections. Either of the two clutches C1 and C2 is energized first and until this clutch has been synchronized more or closed completely, the other clutch will be energized. The choice of which clutch is energized first is dependent on the requirements made of the performance of the vehicle.

The vehicle 1 further comprises an auxiliary electromotor EM which may be connected by means of a further auxiliary clutch C4 to the flywheel F (or has a direct connection to the flywheel) to maintain the flywheel at the right number of revolutions.

FIG. 2 gives a graphical representation plotted against time of the number of revolutions $N_E$ of the combustion engine, the number of revolutions $N_F$ of the flywheel and the acceleration $A_V$ of the vehicle. At instant $T_1$ the further clutch C1 is energized by releasing the brake pedal (in the case of an automatic transmission) or the clutch (in the case of a manually operated transmission) of the vehicle, at instant $T_2$ the clutch C2 is energized, at instant $T_3$ the first fuel is injected into the combustion engine and at instant $T_4$ the first combustion takes place in the combustion engine.

FIG. 3 shows a second embodiment of the vehicle 11 according to the invention in which the starting method according to the invention can be implemented. The starting device 13 is then located on the side of the pulley of the combustion engine E (but may also be located on the side of the transmission) and is formed by an electromotor 15. For starting the combustion engine E and driving the wheels L during the starting operation, the combustion engine is started by means of the electromotor 15 and also the clutch C2 is energized for driving or accelerating the vehicle 11 by means of the electromotor 15.

Albeit the invention has been described in the foregoing with reference to the drawing figure, it should be observed that the invention is not by any manner or means restricted to the embodiment shown in the drawing figures. The invention also extends to all embodiments deviating from the embodiment shown in the drawing figures within the spirit and scope defined by the claims.

What is claimed is:

1. A starting method for starting a combustion engine and/or driving wheels of a vehicle, the starting methods comprising the steps of:
   providing a starting device;
   connecting the combustion engine to an output shaft connected via a clutch to a transmission and/or wheels of the vehicle;
   connecting the starting device to the output shaft of the combustion engine between the combustion engine and the clutch;
   accelerating the output shaft by the starting device with the clutch open;
   closing the clutch before starting the engine, such that the wheels are driven by the starting device prior to the engine starting; and
   starting the engine so that the engine drives the wheels.

2. The starting method as claimed in claim 1, wherein the clutch is energized for driving or accelerating the vehicle prior to fuel being injected into the combustion engine.

3. The starting method as claimed in claim 1, wherein the clutch is energized for driving or accelerating the vehicle prior to the first combustion stage in the combustion engine being initiated.

4. The starting method as claimed in claim 1, wherein the starting device comprises a flywheel as well as a further clutch which is positioned between the flywheel and the output shaft of the combustion engine, wherein while the further clutch is being energized for starting the combustion engine by means of the flywheel, the clutch is also energized for driving or accelerating the vehicle.

5. The starting method as claimed in claim 4, wherein an auxiliary electromotor is connected to the flywheel, and wherein the auxiliary electromotor spins up the flywheel or maintains the flywheel at a correct number of revolutions before the further clutch is energized.

6. The starting method as claimed in claim 4, wherein the flywheel is spun up or maintained at a correct number of revolutions by energizing the further clutch while the combustion engine is running.

7. The starting method as claimed in claim 4, wherein there is a reduction gear present between the further clutch and the output shaft and an auxiliary clutch is present between the reduction gear and the output shaft, wherein during the revving up of the combustion engine the drive from the combustion engine to the reduction gear is interrupted by the auxiliary clutch.

* * * * *